(12) United States Patent
Castinel

(10) Patent No.: US 10,569,795 B2
(45) Date of Patent: Feb. 25, 2020

(54) AUXILIARY TRANSPORT VEHICLE, AUXILIARY TRANSPORT SYSTEM AND METHOD FOR OPERATING AN AUXILIARY TRANSPORT VEHICLE

(71) Applicant: Ford Global Technologies, LLC, Dearborn, MI (US)

(72) Inventor: Anais Castinel, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/138,810

(22) Filed: Sep. 21, 2018

(65) Prior Publication Data
US 2019/0111957 A1  Apr. 18, 2019

(30) Foreign Application Priority Data

Oct. 13, 2017  (DE) ......................... 10 2017 218 389

(51) Int. Cl.
| | |
|---|---|
| *B62B 5/00* | (2006.01) |
| *B60L 53/30* | (2019.01) |
| *B60L 15/20* | (2006.01) |
| *B62B 1/10* | (2006.01) |
| *B62B 7/02* | (2006.01) |
| *G05D 1/00* | (2006.01) |

(52) U.S. Cl.
CPC ............ *B62B 5/0076* (2013.01); *B60L 15/20* (2013.01); *B60L 53/30* (2019.02); *B62B 1/10* (2013.01); *B62B 5/0033* (2013.01); *B62B 7/02* (2013.01); *G05D 1/0022* (2013.01); *B60L 2200/16* (2013.01); *B60L 2260/34* (2013.01)

(58) Field of Classification Search
CPC ....... B62B 5/0076; B62B 1/10; B62B 5/0033; B62B 2200/16; B62K 11/007
See application file for complete search history.

(56) References Cited

U.S. PATENT DOCUMENTS

| | | | | |
|---|---|---|---|---|
| 9,643,638 | B1* | 5/2017 | Wittliff, III | ........... B62B 5/0076 |
| 9,919,762 | B2* | 3/2018 | Kim | ..................... B62K 11/007 |
| 10,310,506 | B1* | 6/2019 | Qi | .......................... G05D 1/0088 |
| 2008/0041644 | A1* | 2/2008 | Tudek | ........................ B60L 7/12 |
| | | | | 180/65.1 |
| 2011/0010024 | A1* | 1/2011 | Salisbury | ................ G06F 3/014 |
| | | | | 701/2 |
| 2013/0248573 | A1* | 9/2013 | Kim | ......................... A45F 4/02 |
| | | | | 224/576 |
| 2013/0271063 | A1* | 10/2013 | Wilson | ..................... A45C 5/14 |
| | | | | 320/103 |

(Continued)

*Primary Examiner* — Brian L Swenson
(74) *Attorney, Agent, or Firm* — Brandon Hicks; Eversheds Sutherland (US) LLP

(57) ABSTRACT

An auxiliary transport vehicle according to the disclosure comprises a drive unit and an attachment that is placed thereon, wherein the drive unit comprises just two wheels with a common axis of rotation and each with an electric drive, an electronic control device and an electrical energy storage device, and wherein the control device is embodied for actuating the drives in such a way that the auxiliary transport vehicle is kept in an upright position, and for autonomously driving the auxiliary transport vehicle to a specifiable destination and for following an external control device. The disclosure also concerns an auxiliary transport system and a method for operating an auxiliary transport vehicle.

18 Claims, 5 Drawing Sheets

(56) References Cited

U.S. PATENT DOCUMENTS

| | | |
|---|---|---|
| 2014/0277841 A1 | 9/2014 | Klicpera et al. |
| 2015/0006005 A1 | 1/2015 | Yu et al. |
| 2016/0059875 A1* | 3/2016 | Segman ............... B62B 5/0063 |
| | | 701/24 |
| 2017/0086549 A1* | 3/2017 | Caputo .................... A45C 5/14 |
| 2017/0183023 A1* | 6/2017 | Richards ............... B62B 5/0043 |
| 2019/0037994 A1* | 2/2019 | Herrmann ............. B62B 5/0033 |
| 2019/0232849 A1* | 8/2019 | Kaneko .................. B60P 1/003 |

* cited by examiner

AUXILIARY TRANSPORT VEHICLE, AUXILIARY TRANSPORT SYSTEM AND METHOD FOR OPERATING AN AUXILIARY TRANSPORT VEHICLE

CROSS-REFERENCE TO RELATED APPLICATIONS

The disclosure claims priority to and the benefit of German patent application No. 102017218389.6, filed Oct. 13, 2017, which is incorporated by reference herein in its entirety.

FIELD

The disclosure concerns an auxiliary transport vehicle, an auxiliary transport system and a method for operating an auxiliary transport vehicle.

BACKGROUND

In many towns, traffic with motor vehicles is restricted. Thus, for example, many town centers are at least partly identified as pedestrian zones, in which as a rule only certain authorized vehicles may travel. Moreover, there is hardly any available parking space in many towns.

On the other hand, when visiting a town center, there is often the need to transport loads or even, for example, small children, for example, during a shopping trip. The same applies, for example, to a picnic in a park, wherein transport independent of a motor vehicle is also necessary. Carrying by means of a bag or a rucksack is uncomfortable or impossible, depending on the weight of the load to be transported. Manually movable means of transport with wheels, such as shopping trolleys or strollers, can also require a considerable effort in terms of force and attention, especially if a heavy cargo is to be transported and/or gradients are to be overcome.

In US 2015/0006005 A1, an autonomous unmanned road vehicle is known that can be used as a delivery vehicle. The road vehicle has a control system for autonomous driving and a detection system for detecting objects in the surroundings thereof and one or more load tables for the transport of the goods to be delivered.

In US 2014/0277841 A1, a motorized luggage container is disclosed comprising a number of wheels, of which at least one is electrically driven and at least one comprises a steering mechanism. The luggage container comprises one or more batteries and a controller, which can be arranged such that the luggage container follows a wireless remote controller carried by a user at a certain distance.

Furthermore, an electrically driven single person means of transport is known that comprises only two wheels lying on the same axis, between which the carried person stands and that is kept balanced by an electronic drive controller (https://de.wikipedia.org/wiki/Segway_Personal_Transporter).

BRIEF DESCRIPTION

It is the object of the present disclosure to specify an auxiliary transport vehicle, an auxiliary transport system and a method for operating an auxiliary transport vehicle, whereby a user, in particular moving on foot in an urban environment, can be facilitated in taking cargo and/or a small child with them.

This object is achieved by an auxiliary transport vehicle, an auxiliary transport system and a method for operating an auxiliary transport vehicle as specified in the independent claims An auxiliary transport vehicle according to the disclosure comprises a drive unit and an attachment that is placed on and fastened to the drive unit and that is embodied to hold or accept a cargo that is to be transported and/or a small child that is to be transported. For fastening the attachment to the drive unit, the top of the drive unit and the bottom of the attachment can be embodied to match each other and comprise corresponding fastening means.

The drive unit comprises just two wheels, with which the drive unit can drive on a surface. The two wheels have a common axis of rotation or the axes of rotation of the two wheels are essentially disposed coaxially. A respective electric drive is associated with each of the two wheels, with which the relevant wheel can be driven, in particular independently of the respective other wheel. Furthermore, the drive unit comprises an electronic control device for actuating the electric drives of the two wheels. the drive unit also comprises an electrical energy storage device for supplying the drives of the wheels and the electronic control device with electrical energy. The electrical energy storage device is preferably embodied as a rechargeable energy storage device and can for example comprise one or more accumulators.

According to the disclosure, the electronic control device is embodied for actuating the drives in such a way that the auxiliary transport vehicle is kept in an at least approximately upright or vertical position. The electronic control device can comprise suitable sensor means for this purpose and a suitably arranged processor. Controllers of this type for dynamic stabilization of vehicles with only two adjacently disposed wheels are known.

Furthermore, the electronic control device according to the disclosure is arranged for autonomous driving of the auxiliary transport vehicle to a specifiable destination; an operating mode of this type of the auxiliary transport vehicle, in which a specified destination is headed for, is referred to here as a first operating mode. The electronic control device is further embodied for operating the auxiliary transport vehicle in a second operating mode, in which the auxiliary transport vehicle follows an external control device. The auxiliary transport vehicle is also operated autonomously in the second operating mode, but is restricted but in the sense that the speed and the direction in which it is travelling are determined while taking into account at least the position of the external control device, and as a result the auxiliary transport vehicle follows the movement of the external control device.

Controllers for autonomously heading for a destination or for following an external control device are also known. The electronic control device of the auxiliary transport vehicle can comprise suitable sensor, processor and communications means for autonomous driving and for operating the auxiliary transport vehicle in the first and in the second operating modes. The external control device can for example be a user's smartphone that is equipped with a suitable app or a special remote controller, wherein the electronic control device of the auxiliary transport vehicle receives information about the location of the external control device or user wirelessly. Said information can be specified relative to the location of the auxiliary transport vehicle or for example in relation to geographic coordinates, wherein the auxiliary transport vehicle can be embodied for determining the own position thereof, for example by means of a GPS receiver.

The first and second operating modes are preferably carried out alternatively or alternately, wherein further ways of operating can be provided, such as for example an operating mode for loading and unloading, for charging the electrical energy storage device or a maintenance state. The operating mode can for example be selected manually by the external control device transmitting a suitable signal to the electronic control device of the auxiliary transport vehicle, or even changed over automatically, for example if the auxiliary transport vehicle has reached the specified destination in the first operating mode.

Because the drive unit of the auxiliary transport vehicle comprises just two wheels, with which it can drive on a surface, wherein the two wheels are disposed adjacent to each other and the auxiliary transport vehicle is always kept in an upright position by the electronic control device, the auxiliary transport vehicle can be loaded, unloaded and can keep the cargo under control during operation in a similar way as for example with a shopping trolley or a stroller. Because the control unit comprises a first operating mode, in which the auxiliary transport vehicle can drive autonomously to a specifiable destination, moving the auxiliary transport vehicle from a parking place to a place of use is further enabled. Thus for example, a user can call up an auxiliary transport vehicle of this type when required by for example transmitting the geographic coordinates of the user's location by means of a smartphone to the electronic control device of the auxiliary transport vehicle and specifying the destination as coordinates Finally, because the electronic control device comprises a second operating mode, in which the auxiliary transport vehicle follows an external control device, for example a user's smartphone, the further advantage is achieved that the auxiliary transport vehicle accompanies the user without the user having to apply force or attention for this purpose. The auxiliary transport vehicle can thus facilitate the transport of shopping goods or even taking a small child along during a shopping trip, for example.

The attachment is preferably reversibly placed on the drive unit. This enables the attachment or the drive unit to be exchanged. In particular, the attachment or the drive unit can be automatically replaced, for which automatically operated fastening or connecting means can be provided.

According to a preferred embodiment of the disclosure, the attachment is embodied in a frame or shell form and is designed for accommodating an insert, which for example is inserted manually into the attachment and which can be fastened there. The insert can for example be embodied as a transport container, as a baby seat or even as a cool bag or cool box. Because the frame-like or shell-like attachment is embodied for accommodating a replaceable insert, the loading and unloading of the auxiliary transport vehicle can be further facilitated and the range of uses of the auxiliary transport vehicle can be extended.

Preferably, the attachment and/or the insert comprise retaining and/or securing means for retaining or securing a load to be transported or a person to be transported. The retaining or securing means can for example be embodied as a mountable shell or as a retaining belt. This enables safety during operation of the auxiliary transport vehicle to be increased.

According to a preferred embodiment of the disclosure, the attachment or the insert comprises a slotted cover consisting of an elastic material. The attachment or the insert can for example be embodied as a container with an internal space for receiving goods to be transported, wherein the cover is fixedly connected to the respective walls of the container on three sides and is divided by a slot in the cover starting from the fourth side, so that by bending the cover apart along the slot the internal space of the container is accessible. In this way, receiving, holding, securing and removing a load to be transported is enabled in a particularly simple way.

Furthermore, according to an advantageous embodiment it is provided that the drive unit comprises an electrical connector for supplying an external load with electrical energy, for example for supplying a cooling device of a cool box or cool bag inserted into the attachment. In this case, the electrical energy for the load is provided by the electrical energy storage device of the drive unit. This enables the range of applications of the auxiliary transport vehicle to be additionally extended.

The specifiable destination to which the auxiliary transport vehicle heads autonomously in the first operating mode can be fixedly specified, for example by storing the coordinates of a service station or a parking place in a memory of the electronic control device. It can preferably be provided instead of this or in addition that the destination can be specified by means of a wireless means of transmission. According to said embodiment of the disclosure, for example the coordinates of a user's location can be wirelessly transmitted to the electronic control device, which can then drive autonomously to the user's location.

Further preferably, it can be provided that in the second operating mode the electronic control device actuates the drives of the wheels in such a way that the auxiliary transport vehicle maintains a specified distance or a specified range of distances from the external control device, and thus for example from the user who is carrying the external control device. The distance or the range of distances can for example be determined in such a way that a minimum distance still guarantees the safe and unhindered movement of the user and a maximum distance ensures safe following of the auxiliary transport vehicle and as a rule enables a direct view from the user to the auxiliary transport vehicle. This enables the auxiliary transport vehicle to follow the user who is carrying the external control device in such a way that the user always has the auxiliary transport vehicle within visual monitoring but is not hindered thereby.

An auxiliary transport system according to the disclosure comprises at least one auxiliary transport vehicle that is embodied as described above and that comprises a first drive part and an attachment. Furthermore, the auxiliary transport system comprises at least one second drive part that is embodied according to the first drive part and that for example can be part of a further auxiliary transport vehicle that is embodied as described above, and at least one service station. The service station is embodied for charging the first drive part and/or for replacing the first drive part with the second drive part. For charging the drive part, the drive part can be connected to a suitable charging connector of the service station, preferably automatically connected. For replacing the first drive part with the second drive part, for example the attachment can be automatically removed from the first drive part and placed on the second drive part, wherein the corresponding fastening or connecting means can also be automatically disconnected or connected. An auxiliary transport system of this type enables a user of an auxiliary transport vehicle to be provided with a charged electrical energy storage device of the drive part for maximizing the range.

With a method according to the disclosure for operating an auxiliary transport vehicle that is embodied as described above, the auxiliary transport vehicle is initially located at a parking place or in a service station. The electronic control device of the auxiliary transport vehicle is in the first operating mode. If a user calls up an auxiliary transport vehicle by transmitting his coordinates, for example by means of a suitable app of his smartphone, then the auxiliary transport vehicle autonomously drives to the transmitted destination. When the auxiliary transport vehicle has arrived at or is approaching the location of the user carrying the external control device, for example the smartphone with the suitable app, then the electronic control device is manually or automatically switched into the second operating mode, in which the auxiliary transport vehicle follows the user.

If the use of the auxiliary transport vehicle by the user is finished, then it can be provided that the electronic control device is switched into the first operating mode by means of a termination signal that is for example manually produced and transmitted by the external control device, and the auxiliary transport vehicle drives back to the parking place or the service station autonomously. Autonomous driving to the service station can also be provided during use by the user if the state of charge of the electrical energy storage device falls below a specifiable level; in this case, the electrical energy storage device can be re-charged or the drive unit can be changed in the service station and the auxiliary transport vehicle can be returned to the user with a charged electrical energy storage device.

BRIEF DESCRIPTION OF THE DRAWINGS

The disclosure is described in detail below using the drawings by way of example In the figures.

DETAILED DESCRIPTION

Figure 1A:
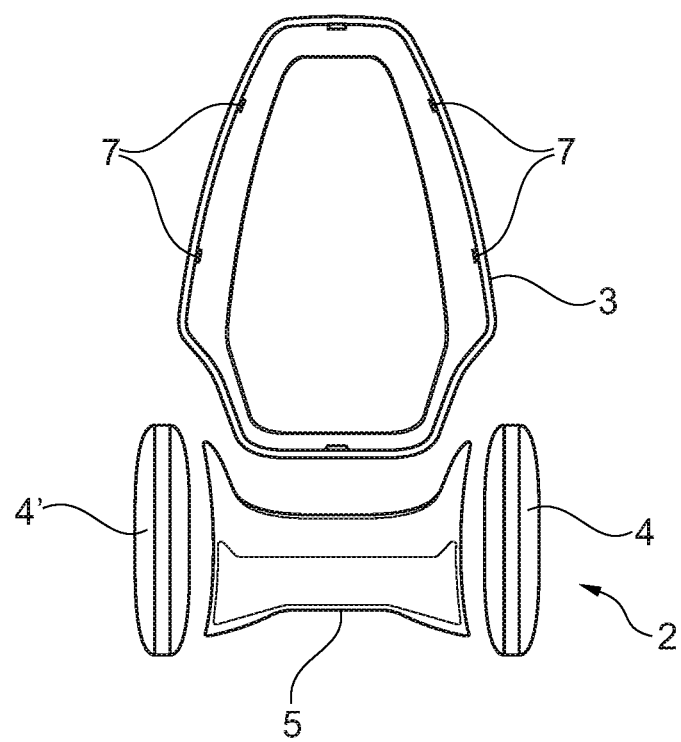
FIGS. 1a through 1c show exemplary embodiments of an auxiliary transport vehicle according to the disclosure.
Figure 1B:
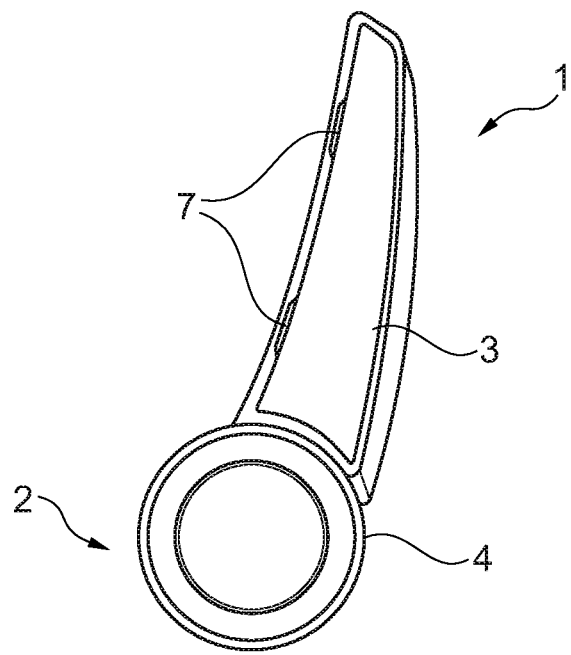
Figure 1C:
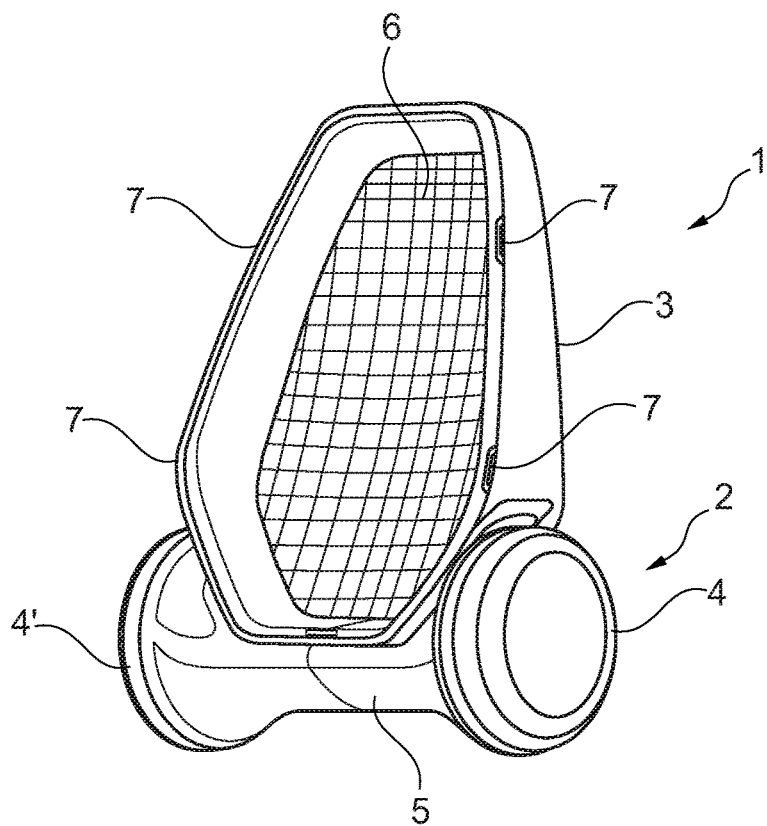

In FIG. 1a, the auxiliary transport vehicle 1 is illustrated in individual parts and in FIGS. 1b and 1c in the assembled state. The auxiliary transport vehicle 1 comprises a drive unit 2 and an attachment 3 placed thereon. The drive unit 2 comprises two adjacent wheels 4, 4' disposed on the same axle and a housing 5, in which further components of the drive unit are housed, in particular an electronic control device with a suitable sensor arrangement and communications means for data transmission as well as the drives of the wheels 4, 4' and one or more accumulators as the electrical energy storage device. The drives can for example have a power of approximately 2 kW. The attachment 3 can, as shown in FIG. 1a, be embodied as a frame that is open to the rear or, as shown in FIG. 1c, in a shell form, possibly with an upholstered rear wall 6. Furthermore, the attachment 3 comprises four eyelets 7 for fastening retaining means.

Figure 2A:
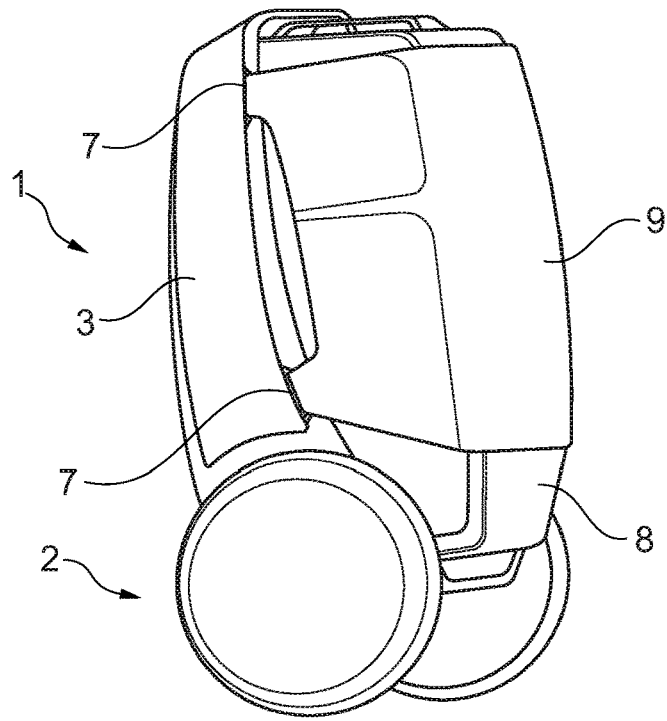
FIGS. 2a and 2b show two exemplary embodiments of an auxiliary transport vehicle according to the disclosure with an item of luggage.
Figure 2B:
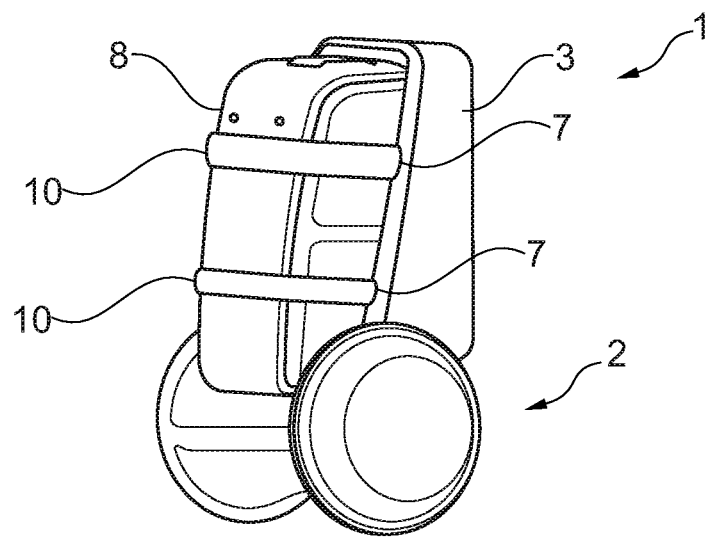

As shown in FIG. 2a, an item of luggage to be transported, for example a bag 8, can be secured by means of a cover 9 inserted in the eyelets 7. FIG. 2b illustrates that the bag 8 can alternatively be secured by means of retaining belts 10 that are pulled through the eyelets 7.

Figure 3:
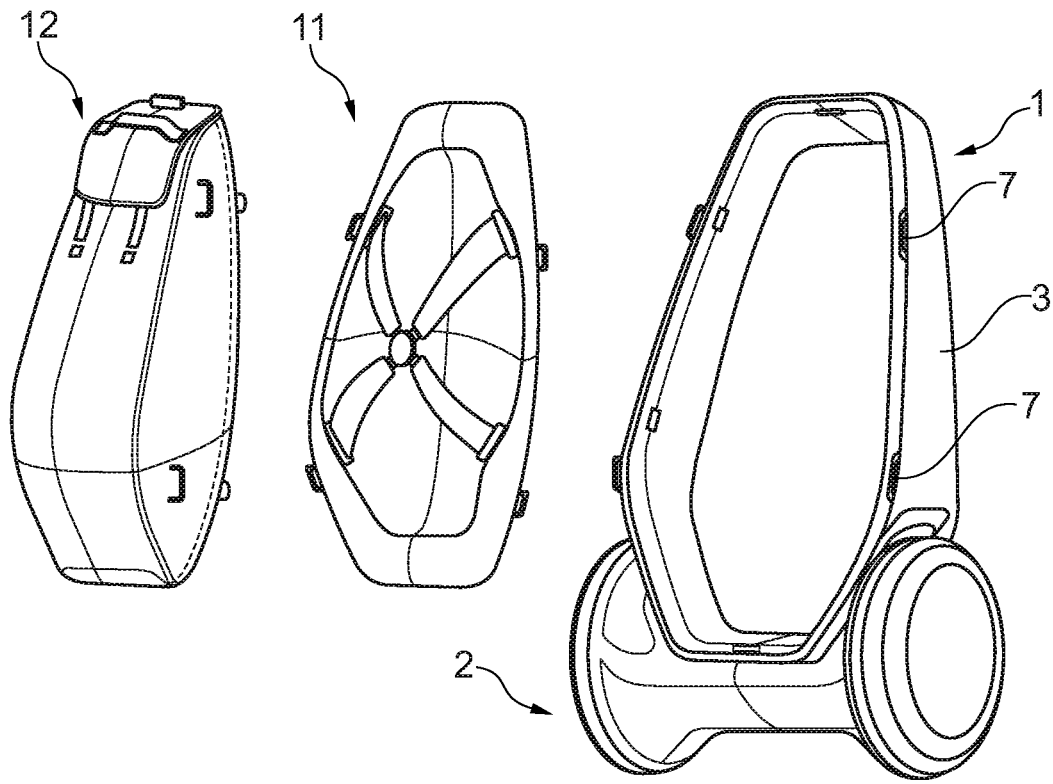
FIG. 3 shows by way of example two possible inserts and a suitably designed auxiliary transport vehicle.

FIG. 3 shows by way of example that inserts of different designs can be alternatively inserted in the attachment 3 and can be fastened therein. As examples of possible inserts, an inflatable baby seat 11 and a cool bag 12 are represented in FIG. 3.

Figure 4:
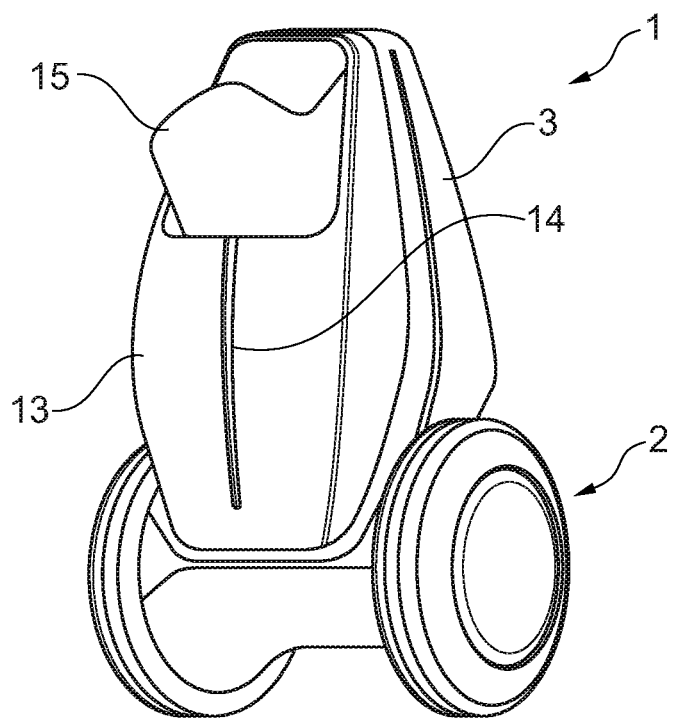
FIG. 4 shows a further exemplary embodiment of an auxiliary transport vehicle according to the disclosure.

An auxiliary transport vehicle 1 with a further embodiment of an insert is shown in FIG. 4. The insert 13 is embodied as a container of a flexible material comprising a frontal slot 14 and a flap 15 at the top. For loading the insert 13, the flap 15 can be pulled up and/or the slot 14 can be opened. Because of the elasticity of the material, the slot 14 closes itself after loading, so that cargo that has been inserted is securely retained in the insert 13. For unloading, a corresponding procedure can be carried out.

Figure 5:
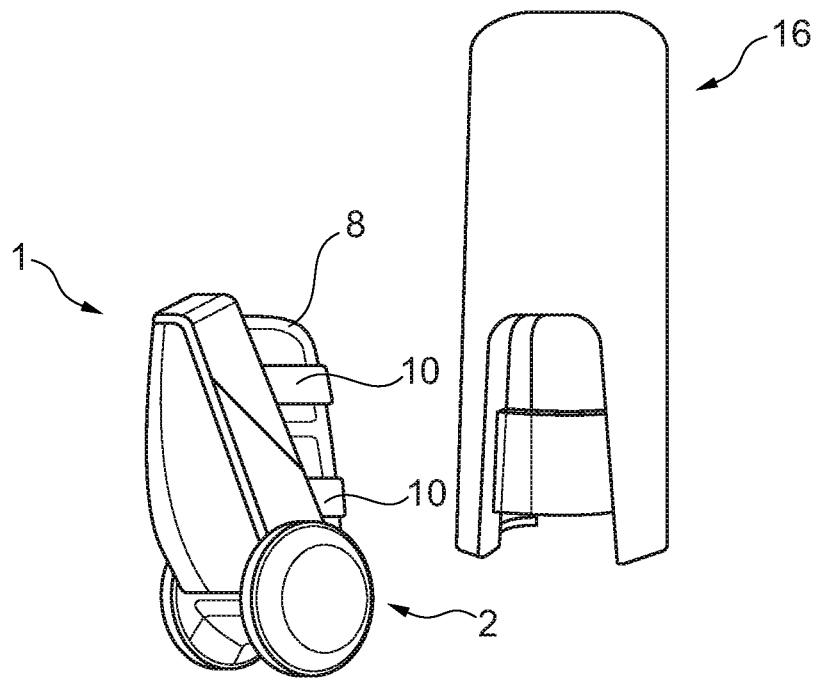
FIG. 5 shows symbolically an auxiliary transport vehicle and a service station according to the disclosure.

In FIG. 5, a charging station 16 is represented symbolically, into which an auxiliary transport vehicle 1 can be autonomously controlled to drive for charging the electrical energy storage device of the drive unit 2. Charging the energy storage device can be carried out by cable by automatically making an electrical connection to a charging connector of the charging station 16 or for example even inductively.

Figure 6:
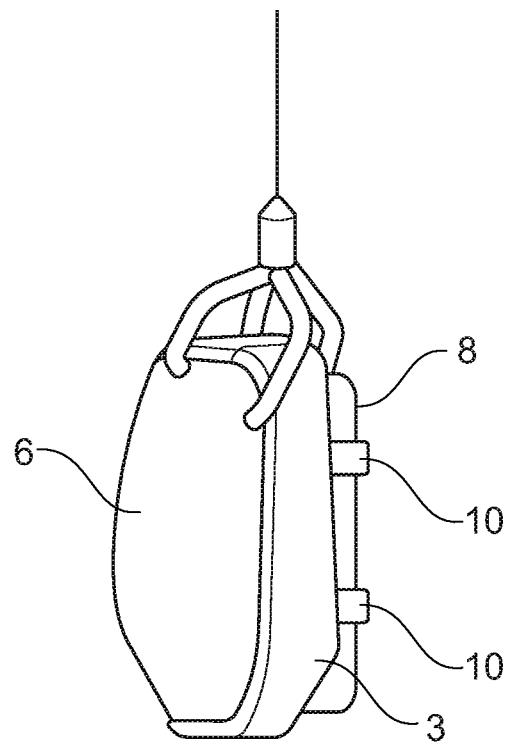
FIG. 6 shows by way of example the replacement of a drive unit of an auxiliary transport vehicle according to the disclosure.
Figure 6:
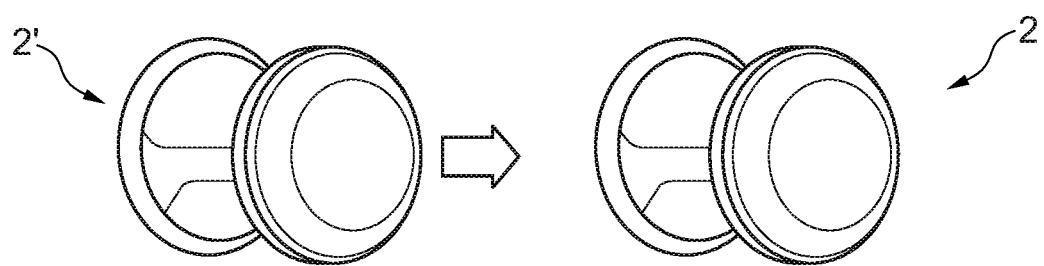

As shown symbolically in FIG. 6, the attachment 3, possibly including a load such as for example a bag 8, can be lifted from the drive unit 2 and placed on a further drive unit 2'. This enables the drive unit 2, if the energy storage device thereof is substantially discharged, to be replaced by the further drive unit 2', the energy storage device of which is fully charged. Said process can also be carried out automatically.

For the sake of clarity, all reference characters are not shown in all figures. Reference characters that are not explained for a figure have the same meaning as in the other figures.

REFERENCE CHARACTER LIST 1 auxiliary transport vehicle
2, 2' drive unit
3 attachment
4, 4' wheel
5 housing
6 rear wall
7 eyelets
8 bag
9 cover
10 retaining belt
11 baby seat
12 cool box
13 insert
14 slot
15 flap
16 charging station

What is claimed is:

1. An auxiliary transport vehicle, comprising:
a drive unit comprising
at least one first drive part, and
at least one second drive part, wherein at least one service station is configured for charging the at least one first drive part and/or for replacing the at least one first drive part with the at least one second drive part; and an attachment placed on the drive unit,
wherein the drive unit comprises two wheels with a common axis of rotation and each with an electric drive, an electronic control device, and an electrical energy storage device, wherein the electronic control device is configured to actuate each electric drive such that the auxiliary transport vehicle is kept in an upright position to autonomously drive the auxiliary transport vehicle to a specifiable destination and to follow an external control device.

2. The auxiliary transport vehicle of claim 1, wherein the attachment is reversbly placed on the drive unit.

3. The auxiliary transport vehicle of claim 1, wherein the attachment is a frame or a shell configured to accommodate an insert.

4. The auxiliary transport vehicle of claim 3, wherein the attachment and/or the insert comprise a retaining and/or securing device for retaining or securing a load to be transported or a person to be transported.

5. The auxiliary transport vehicle of claim 3, wherein the attachment or the insert comprise a slotted cover of an elastic material.

6. The auxiliary transport vehicle of claim 1, wherein the drive unit comprises an electrical connector for supplying an external load with electrical energy.

7. The auxiliary transport vehicle of claim 1, wherein the specifiable destination is specified by a wireless transmission.

8. The auxiliary transport vehicle claim 1, wherein the electronic control device is configured such that the auxiliary transport vehicle follows the external control device at a specifiable distance or within a specifiable range of distances.

9. A method for operating the auxiliary transport vehicle according to claim 1, wherein the auxiliary transport vehicle is located at a parking place or in at least one service station, the method comprising:
  driving the auxiliary transport vehicle autonomously to a user location after a user carrying the external control device enters a request; and
  following, by the auxiliary transport vehicle, the user after reaching the user location.

10. The method of claim 9, wherein, after receiving a termination signal, the auxiliary transport vehicle autonomously drives back to the parking place or to the at least one service station.

11. An auxiliary transport vehicle, comprising:
  a drive unit comprising two wheels with a common axis of rotation, wherein each of the two wheels comprise an electric drive, an electronic control device, and an electrical energy storage device; and
  an attachment configured to be reversbly attached to the drive unit,
  wherein the electronic control device is configured to: actuate the electric drives to keep the auxiliary transport vehicle in an upright position; autonomously drive the auxiliary transport vehicle to a specifiable destination; and follow an external control device, and
  wherein the electronic control device is configured control the auxiliary transport vehicle to follow the external control device at a specifiable distance or within a specifiable range of distances.

12. The auxiliary transport vehicle of claim 11, wherein the attachment is a frame or a shell configured to accommodate an insert.

13. The auxiliary transport vehicle of claim 12, wherein the attachment and/or the insert comprise a retaining and/or securing device for retaining or securing a load to be transported or a person to be transported.

14. The auxiliary transport vehicle of claim 12, wherein the attachment or the insert comprise a slotted cover of an elastic material.

15. The auxiliary transport vehicle of claim 11, wherein the drive unit comprises an electrical connector for supplying an external load with electrical energy.

16. The auxiliary transport vehicle of claim 11, wherein the specifiable destination is specified by a wireless transmission.

17. A method, comprising:
  providing an auxiliary transport vehicle, comprising:
    a drive unit; and
    an attachment placed on the drive unit,
    wherein the drive unit comprises two wheels with a common axis of rotation and each with an electric drive, an electronic control device, and an electrical energy storage device, wherein the electronic control device is configured to actuate each electric drive such that the auxiliary transport vehicle is kept in an upright position to autonomously drive the auxiliary transport vehicle to a specifiable destination and to follow an external control device;
  locating the auxiliary transport vehicle at a parking place or in a service station;
  driving, after a user carrying the external control device enters a request, the auxiliary transport vehicle autonomously to a user location; and
  following, by the auxiliary transport vehicle, the user after reaching the user location.

18. The method of claim 17, further comprising autonomously driving, after receiving a termination signal, the auxiliary transport vehicle back to the parking place or to the service station.

* * * * *